Nov. 29, 1966  R. L. LIPPMAN  3,287,827
TEACHING AID USING TRANSPARENT OVERLAYS
OF DIFFERENT COLORS

Filed May 19, 1964  4 Sheets-Sheet 1

INVENTOR.
ROBERT L. LIPPMAN
BY
Toulmin & Toulmin
ATTORNEYS

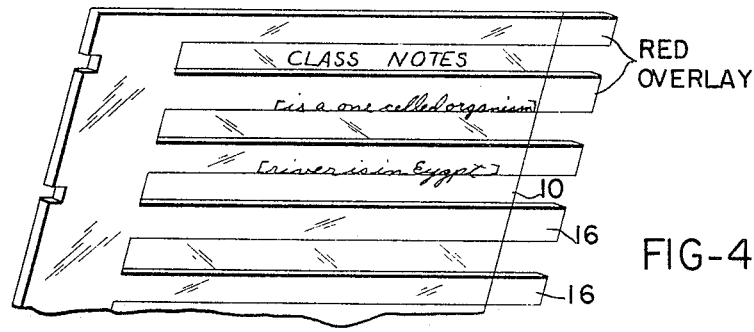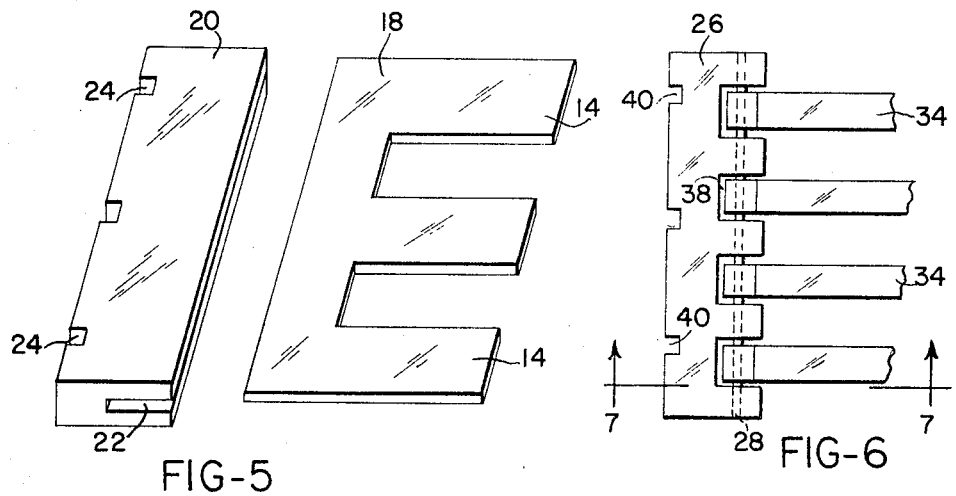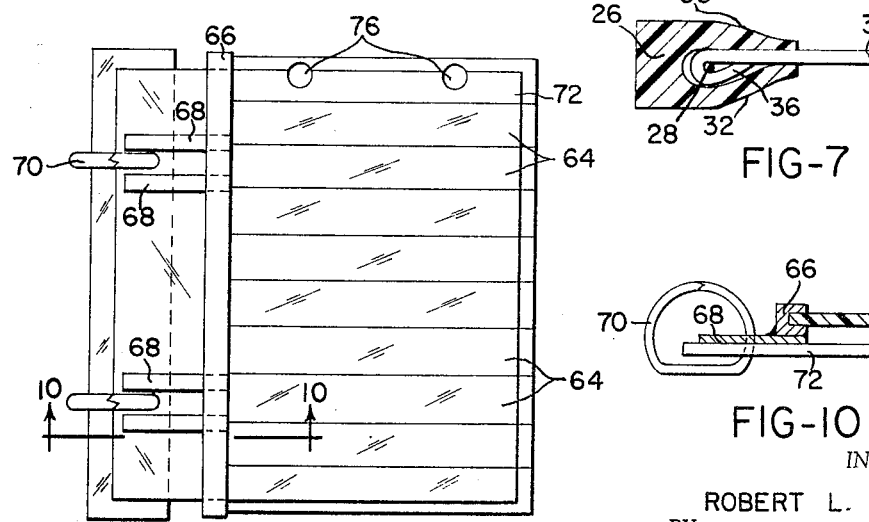

INVENTOR.
ROBERT L. LIPPMAN
BY Toulmin & Toulmin

ATTORNEYS

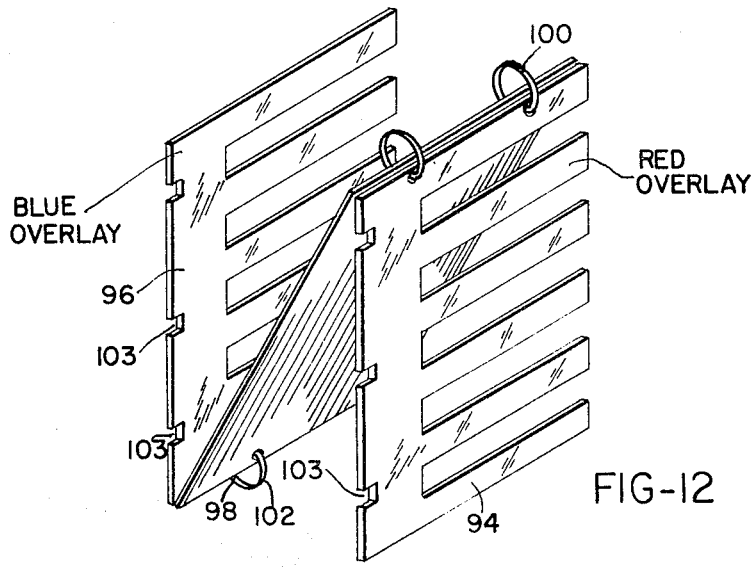
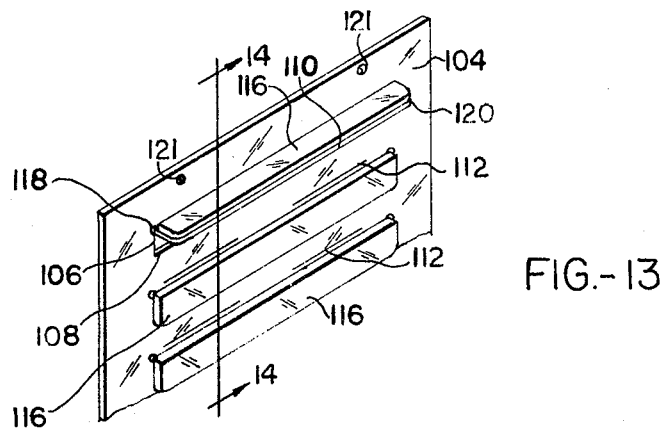

United States Patent Office 3,287,827
Patented Nov. 29, 1966

3,287,827
TEACHING AID USING TRANSPARENT OVERLAYS OF DIFFERENT COLORS
Robert L. Lippman, Big Spring, Tex.
(1135 S. Trenton, Tulsa, Okla.)
Filed May 19, 1964, Ser. No. 368,571
19 Claims. (Cl. 35—9)

This invention relates to a method of teaching and the apparatus related therewith. More particularly, this invention relates to a method of teaching and apparatus therefor for camouflaging certain portions of visual material to be learned through using transparent colored overlay means.

In recent years there has been intensified interest in teaching machines of varied complexity which are designed to accelerate the learning progress of the student and which enable the individual student to proceed at a pace commensurate with his abilities. Some of these machines work on a reward system enabling the student to advance to the next bit of information to be learned only after the correct answer is designated by the student.

These machines are, of course, complex, expensive, and require special skills in the preparation of the programs for the machine.

Some of these machines or devices require special answer sheets against which the student must compare his answers.

Generally, applicant's invention relates to a simplified method of teaching which uses colored transparent overlay means to camouflage certain portions of the visual matter to be learned. The information is reproduced in at least two colors and may be presented in book form, anatomy charts, classroom notes, etc.

A transparent colored overlay means having the same color as one of the colors used in reproducing the information is then placed over the matter to be learned. The matter which was reproduced in the same color as the overlay means then in use is camouflaged and the student determines the material camouflaged or the "answer" from the balance of the information reproduced in a color different from said overlay means and which balance of information shows through the overlay means. Space is provided for the student to write in his answer; this method requires active participation by the student. After the answer is written in, the student verifies his "answer" by removing a portion of the overlay means to expose the "answer" in the context of the "question" or balance of the information.

A second transparent colored overlay means having the same color as the "balance of the information" mentioned above can be placed over the same material to camouflage the previous "question" portion of the information. The student supplies the answer portion as mentioned above.

A main benefit of this method of teaching and apparatus is that the "answer" appears already imbedded in the question. The student does not have to look to a different line, or answer sheet to determine the correctness of his answer. This provides a quick reference to the answer to aid in the student's mastery of the subject matter.

The object of this invention is to produce a low cost teaching device.

A further object of this invention is to produce a low cost teaching device which is adaptable for use in conjunction with books, charts, and students notes.

A further object is to produce a low cost teaching device which can be sold in kit form.

Another object of the invention is to produce a method of teaching which enables the student to check his "answers" by viewing them in the context of the questions.

These and other objects and advantages of this invention will become apparent upon reading of the following specification and drawings in which:

FIGURE 2 shows one transparent colored overlay means in position over the classroom notes of FIGURE 1 with those portions written in a color other than that of the overlay means showing through;

FIGURE 4 shows a second transparent colored overlay means of a color the same as the color in which "Amoeba" and "Nile" of FIGURE 1 were written;

FIGURE 5 shows one form of construction of the overlay means;

FIGURE 6 shows a second form of construction of the overlay means;

FIGURE 7 is a view along lines 7—7 of FIGURE 6;

FIGURE 9 shows a modification adapted to be positioned by the rings of a loose-leaf binder;

FIGURE 10 shows a view taken along lines 10—10 of FIGURE 9;

FIGURE 12 shows yet another modification;

FIGURE 13 shows another modification of the overlay means of the invention in which the movable strips are hinged at both extremities; and FIGURE 14 is a side view of FIGURE 12 taken along line 14—14 of FIGURE 13.

Figure 1:
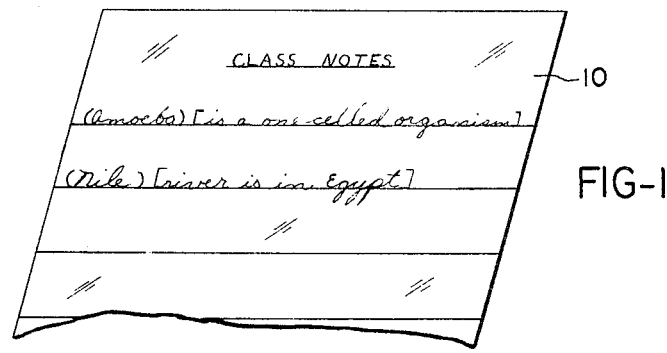
FIGURE 1 shows a portion of classroom notes which are written in two different colors.

Referring to the drawings more in detail, FIGURE 1 shows a portion of a sheet of class notes 10. In taking the notes, the student writes the information in two different colors, for example, in the first sentence he may write Amoeba in red which is shown in parenthesis, and he may write the balance of the sentence in blue which is shown in brackets. The same is true of the second sentence, "(Nile)" is shown in parenthesis and is written in red, and [river is in Egypt] which is bracketed and is written in blue.

In taking the notes the student writes on every other line as shown. While this explanation is given relating to a page of class notes, it is understood that the same technique could be applied to books, professional charts, such as anatomy charts, and other printed matter. Also, in taking the notes, the student could typewrite them in red and blue colors, for example, instead of using colored pens or pencils.

Figure 2:
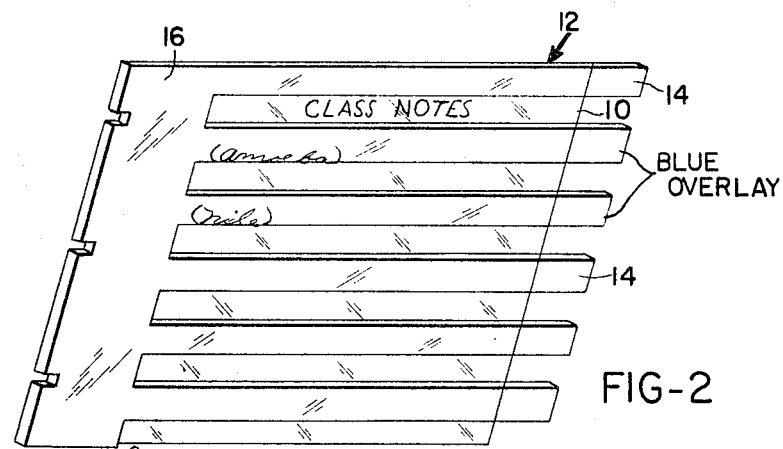

FIGURE 2 shows the same page of class notes as was shown in FIGURE 1; however, a blue transparent overlay means, generally designated 12, is positioned over the page of notes. The overlay means 12 consists of a plurality of strips 14 which are arranged in spaced parallel relation as shown and are hinged to the side member 16. The strips 14 are spaced so that they cover the lines of the page on which the information is written.

Since a blue transparent overlay means was used, the material which was written in red, such as (Amoeba) and (Nile), shows through the blue transparent strips 14. The material which was written in blue and bracketed on FIGURE 1 is camouflaged by the blue overlay means and does not show through.

Figure 3:
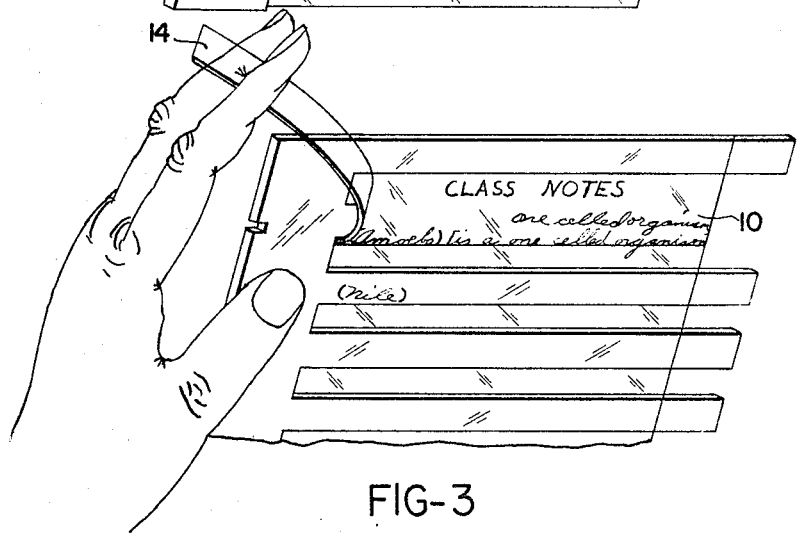
FIGURE 3 shows a method of removing a portion of the overlay means to view the answer in the context of the question.

To check on his learning progress, the student now tries to figure out the balance of the sentence explaining "Amoeba," for example. The student would then write his definition of "Amoeba" on the sheet 10 in the space above the line containing the word "Amoeba," as shown in FIGURE 2. He would then write in something like "one celled organism." He would then raise the strip 14, as shown in FIGURE 3, and thereby reveal the entire sentence shown on that line. In this way he can check his answer with the information on the class notes page 10.

An advantage of this system lies in the fact that his answer appears in the context of the question. It is not necessary for him to look up the answer on another sheet, and so forth. The same process is repeated for the next sentence beginning with "Nile." After he has completed checking on his progress for the entire page, he can at a later time superimpose a red, transparent overlay means on the same page of class notes 10 as shown in FIGURE 4.

Since the material in brackets was written in blue it will show through the red transparent overlay means and the word (Amoeba), which was written in red, will be camouflaged as shown in FIGURE 4. The student would then try to determine what [is a one celled organism] refers to and he would then write in the missing word on the first line of page 10. He would then lift the red transparent strip 16 in order to check his progress, as was done in FIGURE 3.

In writing his answers on the class notes the student can use a pen which has disappearing ink. After a while the information which he wrote in on FIGURE 3, for example, will disappear, so that he will have a clean area on which to write his answers when using the same page of class notes 10 at a later time as shown in FIGURE 4.

In selecting colors for writing the information, the color of the pen or pencil used should match the color of the colored transparent overlay means, so that the information intended to be camouflaged will be completely camouflaged.

FIGURE 5 shows the construction of the overlay means used in FIGURES 2 through 4. In this drawing the number of strips has been reduced to simplify the illustration of the overlay means. The spaced color strips 14 can be notched out of a single sheet of transparent colored plastic material, such as Mylar or colored transparent acetate. The thickness of the sheet should be such as to cause the strip to lie flat against the page when in use and yet be flexible enough to be hinged, as shown in FIGURE 3.

The plurality of strips 14 are integrally hinged to the side marginal portion generally designated 18, and this side marginal portion 18 is inserted into the recess shown in the generlaly C-shaped member 20. The side marginal portion 18 can be suitably adhesively retained in slot 22 of side member 20. Side member 20 has a series of notches 24 therein which are used to align the overlay means on a page in a loose leaf notebook binder.

FIGURE 6 shows another modification of this invention for hinging the strips on to a side member. The side member 26 is generally C-shaped in cross section and has a hinge pin 28 sandwiched between the upper portion 30 and the lower portion 32, as shown in FIGURE 7. Each one of the colored transparent strips 34 has a loop 36 adhesively secured on one end thereof, through which the hinge pin 28 is inserted, as shown in FIGURE 7.

The upper and lower members 30 and 32 are then adhesively secured together to retain the hinge pin and the strip member 34 in the member 26. The notches 38 which are formed in end member 26 align and maintain the colored transparent strips in spaced parallel relation on the page of information when in use. This modification can also have notches 40 in the side member 26 to align the overlay means on a notebook binder as previously explained.

Figure 8:
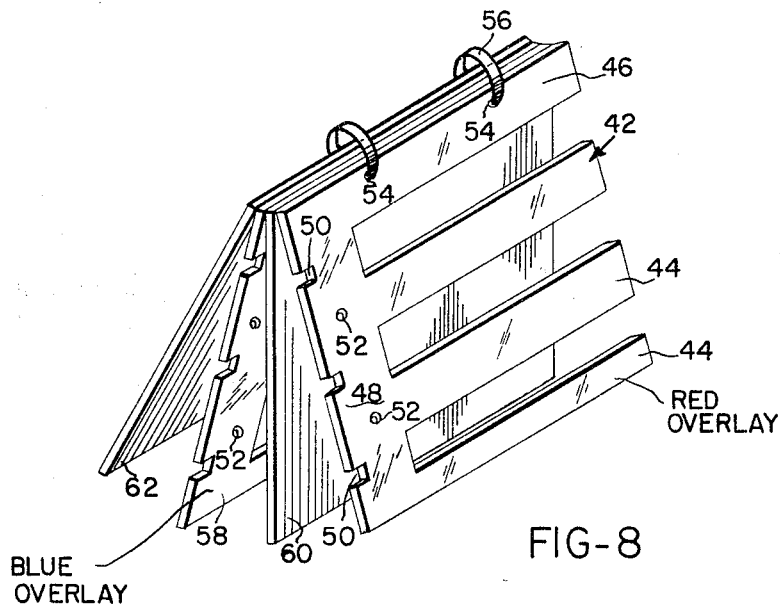
FIGURE 8 shows a preferred embodiment of the invention in kit form.

FIGURE 8 shows a preferred form of the invention in kit form. It consists of a red transparent overlay means generally designated 42 consisting of a plurality of spaced red transparent strips 44 which are cut out of a single sheet of plastic material as shown. The overlay means 42 has a top marginal portion 46 and a side marginal portion 48. The side marginal portion has a plurality of notches 50 which are used to align the overlay means when used with a loose leaf book binder. The thickness of the overlay means should be thick enough to lie flat on a page and to be handled while flexible enough to be hinged.

There are also a series of holes 52 in the side marginal portion which are in alignment with the pertaining colored strips 44. When in use on a page, the student can place a check mark on the notebook page through this hole to indicate important matter requiring extra study. The top marginal portion 46 has two holes 54 therein through which known ring fasteners 56 are inserted. The overlay means 58 is identical to overlay means 42; however, it is made on a blue transparent plastic material, whereas the portion 42 is made on a red transparent plastic material.

To complete the kit, there are two reinforcing sheets 60 and 62 positioned as shown. These two sheets have holes in the top portion through which fasteners 56 are inserted, and the sheets may be made of opaque white acetate which is rigid enough to form a backing sheet.

The student would use the kit shown in FIGURE 8 as follows:

In a single page application, the student would merely slip the page information between reinforcing sheet 60 and overlay means 42. He would then use the overlay means as discussed in connection with FIGURES 2 through 4.

When it is desired to utilize the blue overlay means 58 he would simply flip over the reinforcing sheet 60 and red overlay means 42, so that the blue overlay means 58 is on top and is backed up by reinforcing sheet 62. The single sheet can then be inserted between reinforcing sheet 62 and blue overlay means 58.

When it is desired to use the overlay means in connection with the loose leaf notebook, either the blue or red overlay means can be separated from the kit and independently used with the notebook as previously explained.

The modification shown in FIGURE 9 has a plurality of strips 64 which are retained in a metal side member portion 66 having a generally C-shaped cross section as shown in FIGURES 9 and 10. The side member 66 is securely squeezed to retain the strips 64 which are inserted therein. There are a plurality of strips of metal 68 which are soldered at right angles to end member 66 as shown. These strips 68 are spaced as shown and are inserted around the ring 70 of a loose leaf notebook binder when in use to thereby position the overlay means on the page 72 of the notebook.

The strips 64 of this modification are made of colored transparent plastic strips as previously explained; however, the strips are not spaced but are placed adjacent to one another. In this respect, it is not necessary for the student to be concerned with writing information on every other line as with the prior modification.

When using this modification as shown in FIGURES 9 and 10 it is not necessary for the student to write on every other line of his note page as with the other modification. He simply writes his information on every line of page 72 and the margin 74 of the page 72 is used by the student to write his answers prior to checking by lifting the indivdual strips 64 as previously explained. This modification has the strips starting at the margin of the page 72 to provide a space in the margin 74 whereon the student can write his answers.

The top margin of the overlay means has two holes 76 therein through which fastener means, such as 56 shown in FIGURE 8, can be inserted. The overlay means shown in FIGURES 9 and 10 can be assembled into kit form as shown in FIGURE 8.

Figure 11:
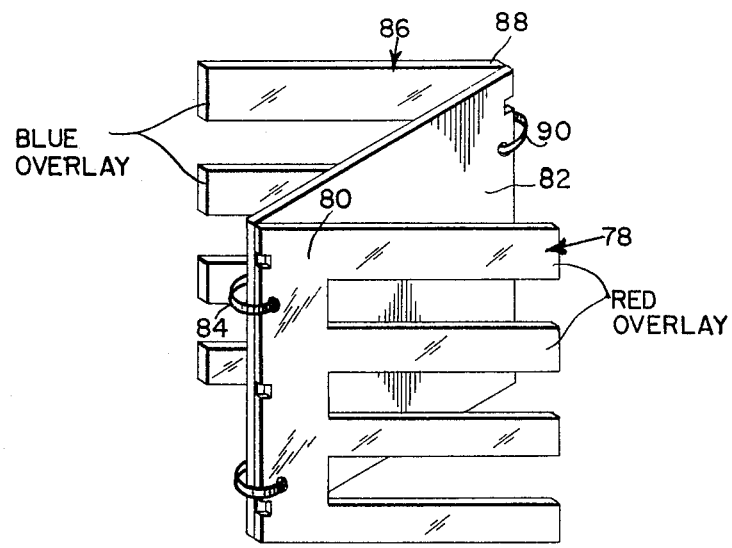
FIGURE 11 shows another modification of the invention in kit form.

FIGURE 11 shows another modification of the kit form. It consists of a red overlay means 78 which has a side marginal portion 80 secured to a reinforcing sheet 82 by ring fasteners 84. The blue overlay means 86 also having a side marginal portion 88 is secured to the opposed side of the reinforcing sheet 82 by ring fastener means 90. The overlay means 78 and 86 are constructed in the same manner as the overlay means shown in FIGURE 8 except they are fastened to a single reinforcing sheet 82 at the side edges thereof as shown.

In using the modification shown in FIGURE 11 a single page of information can be slipped between, for example, the overlay means 78 and the reinforcing sheet 82 and used as previously explained. When it is desired to use the blue overlay means 86 the student simply turns over the kit in the manner similar to turning over a page in a book and then inserts the page between overlay means 86 and the reinforcing sheet 82 to keep the hinge side to his left.

When using the overlay means in connection with a loose leaf binder, the student would merely open the fastener rings 84 or 90 and select the appropriate overlay means and place it in position on the notebook. Each of the overlay means has notches 92 therein to align the overlay means in the loose leaf notebook. The fastener rings 84 and 90 can be made small enough to prevent their interference with writing on the page.

FIGURE 12 shows another modification similar to the type shown in FIGURE 11 except the overlay means 94 and 96 are secured to the reinforcing sheet 98 at the top and bottom marginal portions thereof by ring fasteners 100 and 102, as shown. In this modification there is less chance for the ring fasteners to get in the way of the student while he is writing his answers on the page.

When using the modification for a single page, the page can be slipped under the red overlay means 94, for example, and used as previously explained. To use the blue overlay means 96, the student merely turns the kit over from bottom to top and places the single page between the blue overlay means 96 and the reinforcing sheet 98.

When using the kit with a loose leaf notebook, the desired overlay means is separated from the kit and inserted in a loose leaf notebook and aligned therein by notches 103. In each of the prior modifications, the strips are long enough to extend over the edges of the page of notes to facilitate grasping of the strips.

FIGURES 13 and 14 show a final modification of the overlay means. It consists of a flexible clear plastic sheet 104 on which a plurality of stiff transparent colored plastic strips are secured. The flexible plastic sheet 104 is cut along lines 106 and 108 to produce a strip 110. There are also cut lines 112 as shown to produce hinges at the areas 114. The transparent colored plastic strips 116 are then secured on top of the strip 110.

The flexible sheet 104 is provided with cutout sections 118 to prevent the strip 110 from tearing along the stress areas. The flexible sheet 104 may be provided with reinforced holes 121 through which suitable ring fasteners can be inserted to combine this overlay means with another overlay means to make a kit as shown in FIGURE 8.

In use the overlay means shown in FIGURE 13 would be similar to the overlay means shown in FIGURE 8. However, instead of lifting the strips as shown in FIGURE 3, the strips are lifted by inserting a pen or writing instrument under the corner of the combined strips 110 and 116 which have been notched out at 120 to facilitate lifting by the pen or pencil. The strips 120 are then lifted up along hinge portions 114 to expose the "answer" underneath. In this modification, the area 122 above each flap 120 can be etched to provide a writing surface on which the student can write his answers in disappearing ink as previously explained.

The differently colored writing can be placed on the writing surface by pencil, pen or by typewriter using differently colored ribbon.

The material of the transparent overlays could include Vinyliden Chloride; Vinyl Chloride Copolymer and Plasticized Vinyl Chlorida, as well as other transparent plastic materials capable of carrying a dye.

It will be understood that this invention is susceptible to modification in order to adapt it to different usages and conditions; and accordingly, it is desired to comprehend such modifications within this invention as may fall within the scope of the appended claims.

What is claimed is:

1. A teaching aid adapted to be placed over visual matter to be learned and which matter appears in at least two different colors, said aid comprising; at least two colored transparent overlay means each being adapted to be singly and selectively placed over said visual matter, the color of each said overlay means being the same as a respective one of said colors of the visual matter so as to camouflage the visual matter of the same color as the pertaining overlay means then in use and thereby cause the user to determine the camouflaged matter by viewing the matter showing through the overlay means then in use, each said overlay means comprising a plurality of parallel strips adapted to be singly moved to permit the user to see the previously camouflaged matter in the context of the matter which showed through the said overlay means then in use, means moveably interconnecting said overlay means, each strip of one overlay means being adapted to cover the same portion of said visual matter as a respective strip of the other overlay means.

2. The teaching aid as claimed in claim 1 further comprising an opaque sheet and, a means detachably connecting said overlay means to said opaque sheet to form a kit.

3. A teaching aid adapted to be placed over visual matter to be learned which matter appears in at least two different colors and is placed in line form on a page comprising; two colored transparent overlay means each being adapted to be singly placed over said page containing the visual matter, the color of each said overlay means being the same as one of said colors of the visual matter so as to camouflage the visual matter of the same color as the pertaining overlay means then in use and thereby cause the user to determine the camouflaged matter by viewing the matter showing through the overlay means then in use, each said overlay means comprising a plurality of flexible parallel strips and each said strip adapted to cover a line of visual matter on said page, each said strip being hinged to said overlay means and adapted to be singly moved to expose the previously camouflaged matter in the context of the matter which showed through the said overlay means then in use to permit the user to check upon his learning progress.

4. The teaching aid as claimed in claim 3 in which said two overlay means each has a top marginal section and fastener means to detachably attach said overlay means together along said marginal sections to form a unit.

5. The teaching aid as claimed in claim 4 in which each said overlay means has a side marginal section from which said plurality of strips is hinged, said side marginal section also having slots therein adapted to be inserted in the rings of a loose leaf notebook binder, and also having apertures therein to permit the user to make check marks therethrough to highlight important matter appearing under said strips, said strips also being of sufficient length to extend over the edge of said page.

6. The teaching aid as claimed in claim 4 further comprising an opaque reinforcing sheet placed behind each said overlay means and being detachably attached behind the pertaining overlay means by said fastener means.

7. The teaching aid as claimed in claim 3 in which each said overlay means has a side marginal portion from which said strips are hinged, and further comprising an opaque sheet joining member, and hinge means, the side marginal portion of each overlay means being detachably hinged to a respective one of the lateral sides of said opaque sheet by said hinge means.

8. The teaching aid as claimed in claim 3 in which each said overlay means has a top marginal section and a side marginal section, an opaque sheet of a size smaller than said overlay means, and hinge means, the said top marginal section of each said overlay means being hinged to a respective one of the sides of said opaque sheet by said hinge means, the side marginal portion of each overlay means being positioned along the edge of said opaque sheet to which the pertaining overlay means is hinged and adapted to lie on the said one edge.

9. The teaching aid as claimed in claim 3 in which each said overlay means further comprises a rigid frame member along one side of said overlay means and adapted to retain said strips therein, at least two pairs of spaced parallel rigid members projecting at right angles from said rigid frame member and secured thereto and adapted to receive metal notebook rings to orient the overlay means on said page.

10. A teaching aid adapted to be placed over visual matter to be learned which matter appears in at least two different colors and is placed on every other line of a page, said teaching aid comprising; two colored transparent overlay means each being adapted to be singly placed over said page containing the visual matter, the color of each said overlay means being the same as one of said colors of the visual matter so as to camouflage the visual matter of the same color as the pertaining overlay means then in use and thereby cause the user to determine the camouflaged matter by viewing the matter showing through the overlay means then in use, each said overlay means comprising a plurality of spaced parallel strips each adapted to cover a respective line of visual matter on said page, each said strip being hinged to its respective said overlay means and adapted to be singly moved to expose the previously camouflaged matter in the context of the matter which showed through the said overlay means then in use to permit the user to check upon his learning progress.

11. The teaching aid as claimed in claim 10 in which each said strip has a free end which extends over the edge of said page to facilitate grasping the strip.

12. A teaching aid adapted to be placed over visual material to be learned, which material is reproduced in at least two different colors comprising; two groups of strips each comprising a frame member, a plurality of parallel strips of colored transparent material attached to said frame, the strips of each group being of the same color as a respective one of said two different colors, said strips being adapted to overlay said visual matter and thereby camouflage the visual matter therebeneath reproduced in the same color as said strips and cause the user of the teaching aid to determine the camouflaged matter by viewing the material of a different color being seen through said strips, each said strip being selectively movable to expose the matter previously camouflaged thereby for the user to check his learning progress, each strip of one group being adapted to overlay the same portion of the visual material as a respective strip of the other group.

13. The teaching aid as claimed in claim 12 in which each said group of strips is cut from a single sheet of transparent material and in which all the strips are hinged to said sheet along one side thereof, said frame member comprising a generally C-shaped member in cross section adapted to receive and retain said one side of said sheet.

14. The teaching aid as claimed in claim 12 in which said strips of each group are separate from one another, and a frame member hingedly receiving the strips of each group.

15. The teaching aid as claimed in claim 14 in which said frame member has upper and lower longitudinal members secured to each other and having a plurality of spaced parallel notches therein to receive said parallel strips, and hinge pin means secured between said upper and lower members and passing through said notches, said parallel strips having loops on one end through which said hinge pin means passes to retain said strips, said pin mean and notches cooperating to keep said strips in parallel relationship with one another.

16. A teaching aid combination comprising; a sheet adapted to receive visual material to be learned reproduced thereon in at least two different colors, and at least two transparent overlay means adapted to singly and selectively cover the said visual material, means movably interconnecting said overlay means, the color of each said overlay means being the same color as one of said two different colors, so as to camouflage the portion of the visual material reproduce in the same color as the respective overlay means then in position over said material while the other portion of the material will be visible through the said overlay means then in position whereby the user of combination is required to determine the camouflaged material by viewing the material showing through the transparent overlay means then in use, each said overlay means comprising a plurality of individually movable parts each adapted for covering a predetermined region of said sheet.

17. A teaching aid combination comprising; visual material to be learned consisting of information reproduced in at least two different colors, said material appearing in spaced parallel relationship in lines on a sheet, and at least two transparent overlay means adapted to singly cover the said visual material, the color of each said overlay means being the same color as a respective one of said two different colors, so as to camouflage the visual material reproduced in the same color as the overlay means then in position over said material and thereby cause the user of said combination to determine the camouflaged material by viewing the material showing through the transparent overlay means then in use, each said overlay means comprising a plurality of movable sections thereon in spaced parallel relationship and each section being adapted to cover a line on said sheet, the spaces between the spaced movable sections being superimposed over the spaces between said lines to permit the user to write answers on said sheet, said sections being adapted to be singly moved to permit the user to raise a section and check his answer by viewing the material appearing on said line.

18. A teaching aid combination comprising; visual material in book form to be learned consisting of information reproduced in at least two colors, and at least two movably interconnected transparent overlay means adapted to singly and selectively to cover the said visual material, the color of each said overlay means being the same color as a respective one of said two different colors so each overlay means will camouflage the portion of said visual material of the same color and thereby cause the user of combination to determine the camouflaged portion of the material by viewing the material showing through the transparent overlay means then in use, said material being reproduced in lines, and said overlay means comprising separately movable strips each of which corresponds to at least one of said lines.

19. In combination; a member having a writing surface having strip-like regions to receive lines of writing in two different colors, at least two differently colored transparent overlays movably connected to said member so as to be placed singly and selectively over the said surface of said member, each said overlay comprising a plurality of strips, each strip being adapted for covering at least one of said strip-like regions on said member, and each strip of one overlay covering the same portion of said member as a respective strip of the other overlay.

References Cited by the Examiner
UNITED STATES PATENTS

| | | | |
|---|---|---|---|
| 1,032,024 | 7/1912 | Rawlings. | |
| 2,357,082 | 8/1944 | Carolin | 35—48.1 |
| 2,531,142 | 11/1950 | Madison | 35—9 |
| 3,174,231 | 3/1965 | Schure | 35—9 |
| 3,181,252 | 5/1965 | Goldschmidt et al. | 35—9 |

EUGENE R. CAPOZIO, *Primary Examiner.*

R. E. KLEIN, *Assistant Examiner.*